(12) United States Patent
Wang

(10) Patent No.: US 10,331,472 B2
(45) Date of Patent: Jun. 25, 2019

(54) VIRTUAL MACHINE SERVICE AVAILABILITY

(71) Applicant: Hewlett Packard Enterprise Development LP, Houston, TX (US)

(72) Inventor: Bo Wang, Shanghai (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 223 days.

(21) Appl. No.: 15/503,138

(22) PCT Filed: Aug. 29, 2014

(86) PCT No.: PCT/CN2014/085541
§ 371 (c)(1),
(2) Date: Feb. 10, 2017

(87) PCT Pub. No.: WO2016/029440
PCT Pub. Date: Mar. 3, 2016

(65) Prior Publication Data
US 2017/0228250 A1    Aug. 10, 2017

(51) Int. Cl.
*G06F 9/455* (2018.01)
*G06F 9/50* (2006.01)
*G06F 11/30* (2006.01)
*G06F 11/20* (2006.01)

(52) U.S. Cl.
CPC ......... *G06F 9/45558* (2013.01); *G06F 9/455* (2013.01); *G06F 9/50* (2013.01); *G06F 11/202* (2013.01); *G06F 11/30* (2013.01); *G06F 11/3006* (2013.01); *G06F 11/3055* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 7,636,324 B2 | 12/2009 | Nassar | |
| 7,925,923 B1 | 4/2011 | Hyser | |
| 8,341,626 B1 | 12/2012 | Gardner et al. | |
| 8,681,821 B1 | 3/2014 | Vincent | |
| 2008/0104587 A1 | 5/2008 | Magenheimer et al. | |
| 2009/0106571 A1 | 4/2009 | Low et al. | |
| 2010/0325268 A1* | 12/2010 | Muthiah | G06F 9/505 709/224 |

(Continued)

FOREIGN PATENT DOCUMENTS

| | | | |
|---|---|---|---|
| CN | 102460393 A | 5/2015 | |
| EP | 1482404 | 12/2001 | |

OTHER PUBLICATIONS

International Searching Authority, "International Search Report", PCT/CN2014/085541, dated May 21, 2015, 12 pages.

(Continued)

*Primary Examiner* — Kenneth Tang
(74) *Attorney, Agent, or Firm* — Hewlett Packard Enterprise Patent Department

(57) ABSTRACT

A plurality of services are monitored to determine if a service availability of a service is reduced. An instance of a second service executing on a virtual machine on a server is deactivated. A second virtual machine is activated on the server to execute an instance of the service with reduced availability.

15 Claims, 6 Drawing Sheets

(56) References Cited

U.S. PATENT DOCUMENTS

2013/0182714 A1    7/2013  Vachharajani et al.
2014/0173591 A1*  6/2014  Lin ..................... G06F 9/45533
                                                                                 718/1
2015/0127970 A1*  5/2015  Bivens ................ G06F 11/2007
                                                                                 714/4.11

OTHER PUBLICATIONS

Unknown, "NEC's Carrier-Grade Cloud Platform Deploying Virtualized Network Functions in Cloud", NEC, White Paper TE-524263, 2014, 11 pages.

* cited by examiner

VIRTUAL MACHINE SERVICE AVAILABILITY

BACKGROUND

Some network functions comprise a set of intercommunicating network services. The services are self-contained, unassociated, and loosely-coupled units of functionality, each implementing at least one action. Services in a network function may have different availability requirements. Additionally, the services of a network function may be implemented with various levels of redundancy.

BRIEF DESCRIPTION OF THE DRAWINGS

Certain examples are described in the following detailed description and in reference to the drawings, in which.

DETAILED DESCRIPTION

In some network functions, certain services may have higher service availability requirements than other services. For example, a real time charging and policy control system for a communication service provider may have an access layer, a business and database layer, and a management layer. In this example, the access layer and business and database layer may have higher service availability requirements than the management layer. Service availability requirements may be met using service redundancy. For example, an in-memory database executed on a server cluster may be implemented using a plurality of partitions. Redundancy may be achieved by having each partition duplicated at least once on a different server through synchronous replication. Such synchronous replication may affect both performance and cost efficiency. Accordingly, in some implementations, service redundancy may be limited to one active duplicated standby service, such as one duplicated partition per partition. In this scenario, if a server fails, the service operates without a redundant copy during the server's downtime. If a second server fails during the first server's downtime, the service will be unavailable. This risky period of lower service availability, where a second server failure would interrupt the service, may be undesirable for certain services, such as real-time or critical services.

Some implementations of the disclosed technology may improve reliability of a virtualized network function. In some cases, services of the network function may be executed on virtual machines on a server cluster. Resources may be diverted from lower priority services to higher priority services to improve service availability of the higher priority services during server downtime. When service availability of a higher priority service is reduced, an instance of a lower priority service is deactivated to provide an available server. The higher priority service is then activated on the available server. Accordingly, higher priority service's period of reduced availability is reduced, and system reliability is improved without increased hardware costs or performance impact.

Figure 1:
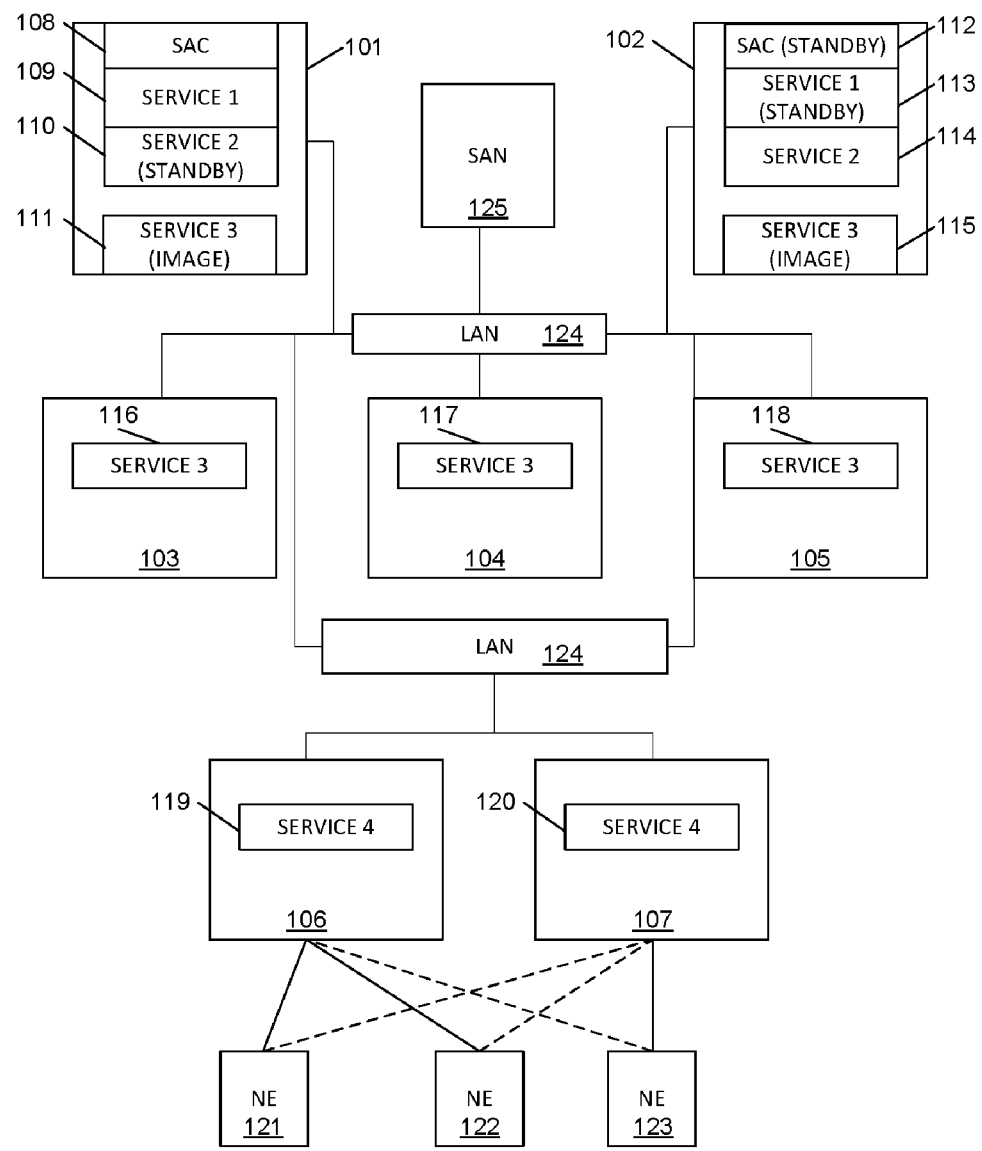
FIG. 1 illustrates an example system including a service availability controller.

FIG. 1 illustrates an example system including a service availability controller 108, 112. For example, the system may be a virtual network function, such as a virtualized real time charging and real time policy control system for a communication service provider. As another example, the system may be virtualized content delivery network. The system may be implemented as a set of services executed on virtual machines on a set of servers.

In the illustrated example, the system includes a management and control layer executed on servers 101, 102. The management and control layer includes instances of a first service 109, 113 and instances of a second service 110, 114. For example, the first service may be a set of management and control processes for managing database services on the system and the second service may be a set of management and control processes for managing business process services on the system. The instances of the first service may include an active instance 109 and a standby instance 113. Similarly, the instance of the second service may include an active instance 114 and a standby instance 110. In some cases, the standby instances 113, 110 are instances of the services that are instantiated and executing in standby mode on executing virtual machines on servers 101, 102.

In the illustrated example, the system further includes a business applications layer. The business applications layer may include instances 116, 117, 118 of a third service executing on a server cluster 103, 104, 105. For example, in a charging and policy control system, the third service may provide a database and execute business and policy applications. In such an implementation, the server cluster may include dozens of servers 103, 104, 105. In some cases, the database may be a partition based in memory database. Each instance 115, 117, 118 may intercommunicate to provide the third service. For example, different instances 115, 117, 118 may provide different partitions of the in memory database. In some implementations, the third service may include multiple databases. For example, the third service may provide a database related to live sessions and a database providing a subscriber profile repository.

In the illustrated example, the system further includes a data access layer. The data access layer may include instances 119, 120 of a fourth service executing on a server cluster 106, 107. For example, the fourth service may provide load balancing and proxy services to connected network equipment 121, 122, 123.

The illustrated example further includes a local area network 124 connecting the servers 101-107 and a storage area network 125 providing communal storage to the system.

In this example, the active service availability controller 108 monitors the availability of the system services. For example, the service availability controller 108 may monitor the state of the service instances 109, 110, 113, 114, 116, 117, 118. The different services may have different availability requirements and different availability tolerances.

The availability requirements may indicate the priority of the service or the degree of redundancy desired for the service. For example, core real time services may have high availability requirements, indicating that a certain level of availability is desired at all times. For example, a high service level requirement may indicate that N+1 service availability is desired at all times; a normal service level requirement may indicate that N service availability (no backups) is tolerable; and a low service level requirement may indicate that the service can be stopped without impact on real time function.

The availability tolerances may indicate the minimum service availability required for the system to function. For example, a high availability tolerance may indicate that a level of redundancy, such as N+1 availability is required for real time system operation; a service normal availability tolerance may indicate that N availability is required for real time system operation; and a low availability tolerance may indicate that the service can be stopped without impact on real time operation. As an example, table 1 illustrates example availability requirements and availability tolerance in an implementation of a real time charging and policy system as described above.

TABLE 1

| Service | Availability Requirement | Availability Tolerance |
|---|---|---|
| Service 1 | Normal | Normal |
| Service 2 | Low | Low |
| Service 3 | High | Normal |
| Service 4 | High | Normal |

In the illustrated example, if a service with high availability requirements becomes unavailable, then the service availability controller instantiates an instance of the service on a server executing a lower priority service. For example, if an instance 116, 117, 118 of service 3 becomes inactive after a failure of server 103, 104, 105, then the service availability controller 108 may instantiate an instance of service 3 on server 102 or 101. In some cases, the service availability controller 108 may instantiate the service using a virtual machine image 111, 115 stored on the server 101, 103. In other cases, the service availability controller 108 may load the virtual machine image from SAN 125. Accordingly, the illustrated example system may use lower priority servers 101, 102 to increase redundancy of higher priority services without increased hardware costs.

Figure 2:
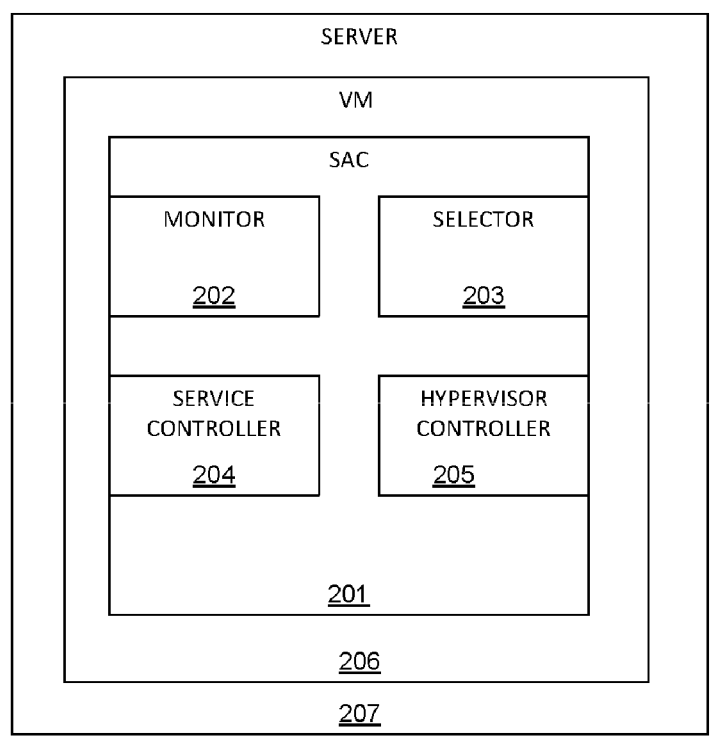
FIG. 2 illustrates an example service availability controller.

FIG. 2 illustrates an example service availability controller 201. For example, the service availability controller 201 may be an instance 108, 112 of the service availability controller of FIG. 1. In some implementations, the service availability controller 201 may be implemented as executable instructions stored on a non-transitory computer readable medium. In some implementations, the service availability controller 201 may be executed on a virtual machine 206 on a server 207. For example, the controller 201 may be executed on the same virtual machine 206 as one of the server's 207 other services, or may be executed on a dedicated virtual machine 206.

The example service availability controller 201 may include a monitor 202. The monitor 202 may monitor the availability of a plurality of services and determine if a first availability of a first service of the plurality of services is reduced. For example, service availability controller 201 may poll instances of the plurality of services to monitor their availability, or may monitor reporting messages sent by the services. The monitor 202 may determine if the service availability is reduced by determining the service has lower than normal redundancy. For example, the monitor 202 may determine if an instance of the service is no longer functioning. For example, if a server executing an instance of the service fails, then the monitor 202 may determine that the service has reduced availability.

The example service availability controller 201 may also include a selector 203. The selector 203 may select a second service of the plurality of services. In some implementations, the selector 203 may select the second service from a list of transferable services associated with the first service. For example, the controller 201 may maintain a list of transferrable services for each service of the plurality of services. In some implementations, the list of transferrable services may be determined by the system administrator and may reflect prioritization of the services. In other implementations, the list of transferrable services may be determined automatically from system parameters. As an example, Table 2 illustrates an example list of transferable services for the example real time charging and policy solution described with respect to FIG. 1. In this example, the business application layer services (Service 3) may preempt the management layer services (Services 1 and 2), each management layer service may preempt the other management layer service. The data access layer service (Service 4) may not be preempted by other services and may not preempt other services.

TABLE 2

| Service | Availability Requirement | Availability Tolerance | Transferable Services |
|---|---|---|---|
| Service 1 | Normal | Normal | Service 2 |
| Service 2 | Low | Low | Service 1 |
| Service 3 | High | Normal | Service 1, Service 2 |
| Service 4 | High | Normal | |

The selector 203 may further select a second service from the list that has an availability that exceeds its availability tolerance. For example, if Service 3 has reduced availability, the selector 203 may select from Service 1 and Service 2. If one of those services is currently at its availability tolerance, than the selector 203 may select the other service. For example, if Service 1 is operating without a backup instance, then it is currently at its availability tolerance, and the selector 203 may select Service 2 from the list of transferrable services for Service 3.

In some implementations, the selector 203 further selects a server that is executing the selected second service. The server may be selected according a service availability requirement weight of active services executed on a plurality of servers. In some cases, the service availability requirement weight may be a combination of the service availability requirements of the executing services. Additionally, the selector 203 may select the server having the lowest service availability requirement weight. For example, in FIG. 1, server 102 may have a lower service availability requirement weight than server 101 because server 102 has Service 2 active while server 101 has Service 1 active. In this case, the selector 203 may select the instance of Service 2 114 and the corresponding server 102.

The example service availability controller 201 may further include a service controller 204. The service controller 204 may deactivate an instance of the second service executing on a virtual machine on a server. In some implementations, the server may be the server selected by the selector 203 according to the service availability requirement weight. For example, the service controller 204 may send an instruction to the virtual machine or the instance of the selected service to cease execution of the selected service.

In some implementations, the service controller 204 may further activate a second instance of the second service executing on a virtual machine on another server. For example, the service controller 204 may activate a hot standby instance of the second service on an active virtual machine. For example, in FIG. 1, the service controller 204 may deactivate the instance 114 of Service 2 and activate the standby instance 110 of Service 2 on server 101.

The example service availability controller 201 may further include a hypervisor controller 205. The hypervisor controller 205 may activate a second virtual machine on the server, the second virtual machine executing an instance of the first service. For example, the hypervisor controller 205 may cause a hypervisor of the server to load the second virtual machine from a virtual machine image or template stored on the server or elsewhere on the network. For example, in FIG. 1, the hypervisor controller 205 may cause a hypervisor executing on server 102 to execute a virtual machine image 115 executing an instance of Service 3.

In some implementations, the service controller 204 may configure the second virtual machine and the instance of the first service according to a configuration of a failed virtual machine and failed instance of the first service. For example, the service controller 204 may configure the second virtual machine and its executing instance of the first service according to the instance of the first service whose failure caused the reduction in availability. For example, the second virtual machine may be stored as template, and the template may be instantiated using the configuration of the failed instance. For example, the second virtual machine may be configured with copies of database partitions that were hosted on the failed virtual machine. After configuration, the service instance may then rejoin the in memory database cluster.

In some implementations, the hypervisor controller 205 may deactivate the first virtual machine after the service controller 204 deactivates the instance of the second service. Accordingly, after deactivating the first virtual machine, the higher priority first service may be the only service executed on the server. Additionally, if the service availability controller 201 has its active instance on the same server, it may activate a standby instance and deactivate its current active instance.

Figure 3:
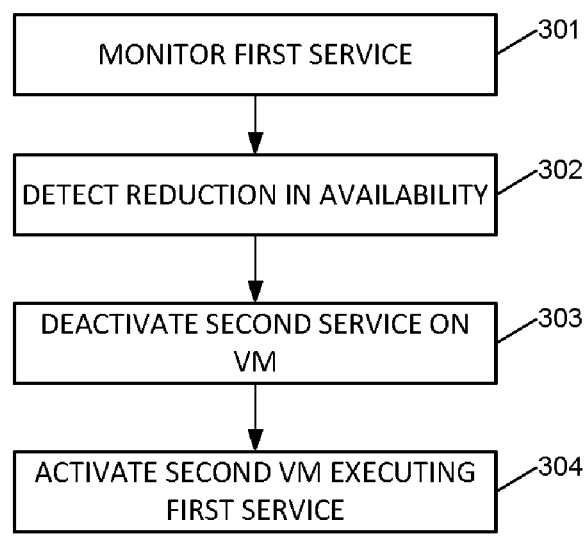
FIG. 3 illustrates an example method of responding to reduced availability of a service.

FIG. 3 illustrates an example method of responding to reduced availability of a service. For example, the illustrated method may be performed by a service availability controller in a virtualized network function system, such as service availability controller 108 of FIG. 1 or service availability controller 201 of FIG. 2.

The example method may include block 301. Block 301 may include monitoring a first availability of a first service, the first service having a first availability requirement and a first availability tolerance. For example, block 301 may be performed as described with respect to the operation of monitor 202.

The example method may further include block 302. Block 302 may include detecting a reduction in the availability of the first service. For example, the reduction in the availability of the first service may occur because of a server failure or virtual machine failure or other error that impedes operation of an instance of the first service.

The example method may further include block 303. Block 303 may include deactivating a second service on an active virtual machine on a server. The second service may have a second availability exceeding its availability tolerance. Additionally, the second service may have an availability requirement lower than the first service's availability requirement. In some implementations, deactivating the second service may include shutting down an instance of the second service executing on a virtual machine. For example, block 303 may be performed as described with respect to the operation of service controller 204 of FIG. 2.

The example method may further include block 304. Block 304 may include activating a second active virtual machine executing the first service on the server. For example, activating the second virtual machine may include instantiating a second virtual machine by a hypervisor on the server from a virtual machine image or template. For example, block 304 may be performed as described with respect to the operation of hypervisor controller 205 of FIG. 2.

Figure 4:
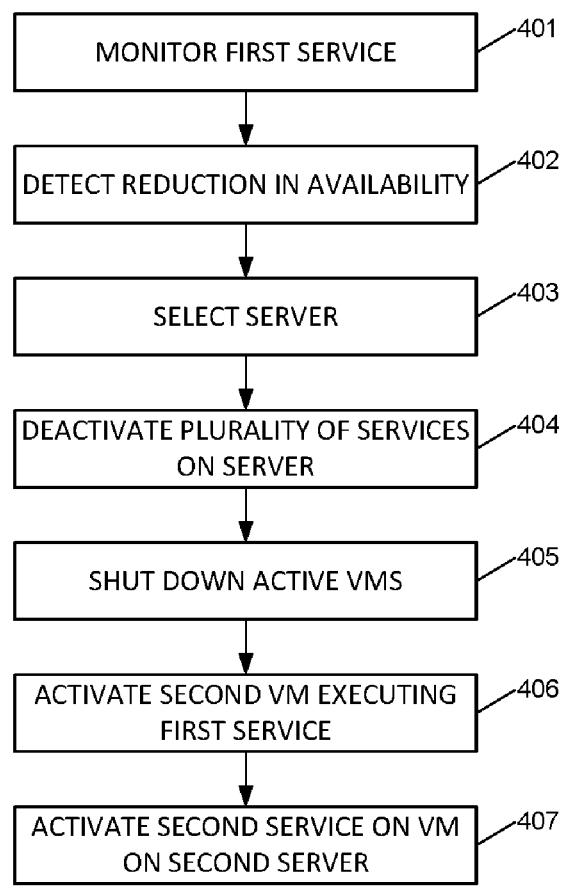
FIG. 4 illustrates another example method of responding to reduced availability of a service.

FIG. 4 illustrates another example method of responding to reduced availability of a service. For example, the illustrated method may be performed by a service availability controller in a virtualized network function system, such as service availability controller 108 of FIG. 1 or service availability controller 201 of FIG. 2.

The example method may include block 401. Block 401 may include monitoring a first availability of a first service, the first service having a first availability requirement and a first availability tolerance. For example, block 401 may be performed as described with respect to block 301 of FIG. 3.

The example method may further include block 402. Block 402 may include detecting a reduction in the availability of the first service. For example, block 402 may be performed as described with respect to block 302 of FIG. 3.

The example method may further include block 403. Block 403 may include selecting a server to use to transfer resources form a set of services on the server to the first service with reduced availability. For example, the server may be selected according to a combined availability requirement of all active services on the server. In some implementations, block 403 may include identifying servers on the network that are executing services on a transferable service list associated with the first service. Of those servers, the selected server may be chosen according to a service availability requirement weight determined from the combined availability requirements.

The example method may further include block 404. Block 404 may include deactivating a plurality of services on the selected server. For example, block 404 may include performing block 303 multiple times. In some implementations, the deactivated services may each have respective service availabilities exceeding their respective service availability tolerances. Additionally, they may have respective service availability requirements lower than the service availability requirement of the reduced availability service detected in block 402. In some cases, the plurality of services on the selected server may include actively operating service instances and active standby service instances. In some cases, after block 404, the selected server may have no active executing services. In other cases, after block 404, the services remaining on the selected server may all be higher in priority than the service with the reduced availability.

The example method may further include block 405. In some implementations, the plurality of services from block 404 are executed on a corresponding plurality of active virtual machines. In these implementations, block 405 may include shutting down the corresponding plurality of active virtual machines after deactivating the plurality of services. For example, block 405 may be performed as described with respect to the operation of hypervisor controller 205 of FIG. 2.

The example method may further include block 406. Block 406 may include activating a virtual machine executing the first service on the selected server. For example, block 406 may be performed as described with respect to block 304 of FIG. 4.

The example method may further include block 407. Block 407 may include activating the second service on a third active virtual machine executing the second service on a second server. For example, block 407 may include instructing a standby instance of the second service to come out of standby operation into active operation. As another example, block 407 may include instantiating a new virtual machine on the second server from an image or template. The new virtual machine may be preconfigured with an instance of the second service. In this case, block 407 may further comprise configuring new the virtual machine and instance of the second service according to the configuration of the deactivated instance and deactivated virtual machine on the first server.

Figure 5:
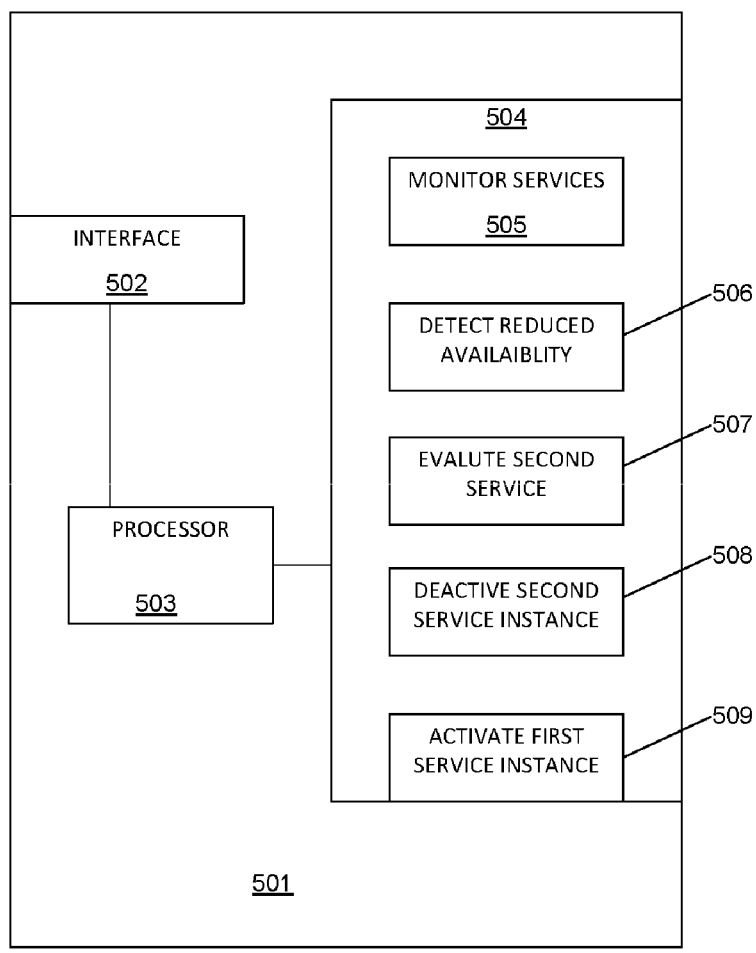
FIG. 5 illustrates an example server including a non-transitory computer readable medium storing instructions for reallocating resources to increase service availability.

FIG. 5 illustrates an example server 501 including a non-transitory computer readable medium 504 storing instructions 505-509 for reallocating resources to increase service availability. The non-transitory computer readable medium 504 may include memory, storage, or a combination thereof. For example, the server 501 may be a server executing a service availability controller on a virtual machine as described with respect to FIGS. 1 and 2 and may operate as described with respect to FIGS. 3 and 4.

The medium 504 may store instruction set 505. Instruction set 505 may be executable by a processor 503 to monitor availabilities of a plurality of services, each service having a respective availability requirement and a respective availability tolerance. In some implementations, instruction set 505 may be executable by the processor to use a network interface 502 to monitor the service availabilities of services on a virtual network function system. For example, instruction set 505 may be executable to implement a monitor 202 as described with respect to FIG. 2.

The medium 504 may further store instruction set 506. Instruction set 506 may be executable to detect if a first availability of a first service of the plurality is reduced. For example, instruction set 506 may be executable to perform block 302 as described with respect to FIG. 3.

The medium 504 may further store instruction set 507. Instructions set 507 may be executable to determine if a second service of the plurality has a respective availability exceeding the respective availability tolerance of the second service, the second service having a lower respective availability requirement than the first service.

The medium 504 may further store instruction set 508. Instruction set 508 may be executable by the processor 503 to deactivate an instance of the second service on a first virtual machine executing on a server. For example, the processor 503 may send an instruction to the instance of the second service using the interface 502. For example, instruction set 508 may be executable by the processor 503 to implement a service controller 204 as described with respect to FIG. 2.

The medium 504 may further store instruction set 509. Instruction set 509 may be executable by the processor 503 to activate an instance of the first service on a second virtual machine executing on the server. For example, the instruction set 509 may be executed to implement a hypervisor controller 205 as described with respect to FIG. 2.

Figure 6:
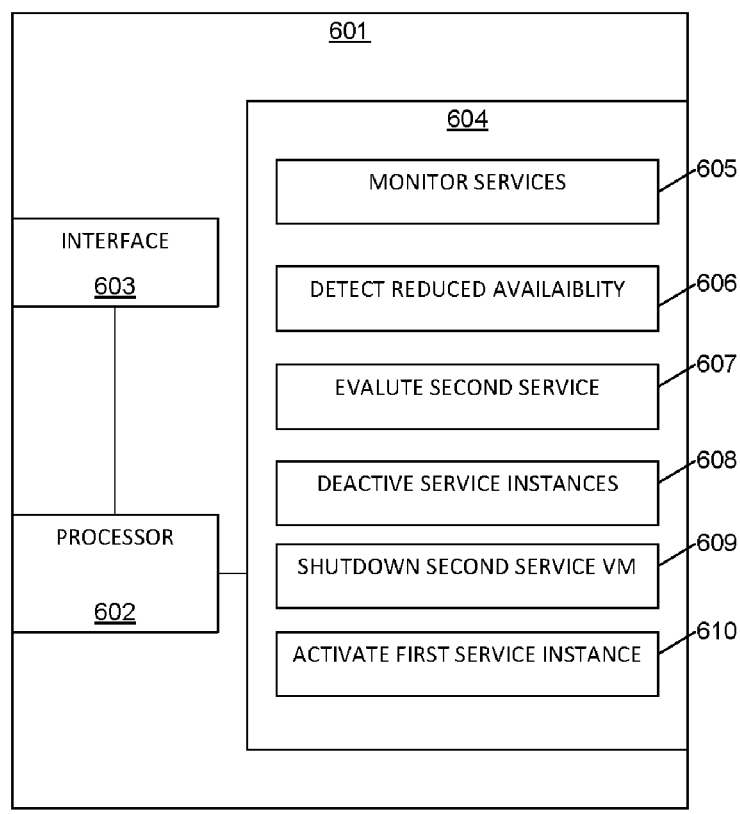
FIG. 6 illustrates another example server including a non-transitory computer readable medium storing instructions for reallocating resources to increase service availability.

FIG. 6 illustrates an example server 601 including a non-transitory computer readable medium 604 storing instructions 605-610 for reallocating resources to increase service availability. For example, server 601 may be a further implementation of a server 501 described with respect to FIG. 5.

The medium 604 may store instruction set 605. Instruction set 605 may be executable by processor 602 as described with respect to instruction 505 of FIG. 5. For example, the instructions set 605 may be executable by the processor 602 to use interface 603 to monitor the availabilities of a plurality of network services, such as services implementing a real-time charging and policy system for a communication service provider.

The medium 604 may further store instruction set 606. Instruction set 606 may be executable by processor 602 as described with respect to instruction set 506 of FIG. 5.

The medium 604 may further store instruction set 607. Instruction set 607 may be executable by the processor 602 as described with respect to instruction set 507 of FIG. 5. Additionally, instruction set 607 may be executable by the processor 603 to select the second service from a list of transferable services associated with the first service. Instruction set 607 may also be executable by the processor 603 to select the server from a plurality of servers according to an availability requirement weight.

The medium 604 may further store instruction set 608. Instruction set 608 may be executable by the processor 602 as described with respect to instruction set 508 of FIG. 5. Additionally, instruction set 607 may be executable by the processor 602 to deactivate instances of any services executing on the server that have lower availability requirements than the first service and have availabilities exceeding corresponding availability tolerances. For example, instruction set 607 may be executable by the processor 602 to perform block 404 of FIG. 4.

The medium 604 may further store instruction set 609. Instruction set 609 may be executable by the processor 602 to shut down the first virtual machine after deactivating the instance of the second service. For example, instruction set 609 may be executable by the processor 602 to send an instruction to a hypervisor executing the first virtual machine using the interface 603.

The medium 604 may further store instruction set 610. Instruction set 610 may be executable by the processor 603 to configure the second virtual machine and the instance of the first service according to a configuration of a failed virtual machine and failed instance of the first service. For example, instruction set 610 may be executable by the processor 603 to retrieve the configuration of the failed virtual machine and failed instance from a storage area network or other network location. Instruction set 610 may be further executable by the processor 603 to send the configuration to a server that will be executing the second virtual machine with instructions for the server to configure the virtual machine and the instance of the first service.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A service availability controller implemented within a server, comprising:
   a monitor to monitor availability of a plurality of services and determine if a first availability of a first service of the plurality of services is reduced;

a selector to select a second service of the plurality of services from a list of transferable services associated with the first service and having a second availability exceeding an availability tolerance if the first service is determined to be reduced based on monitoring the availability of the plurality of services;

a service controller to create capacity for the first service by deactivating an instance of the second service executing on a first virtual machine on the server; and a hypervisor controller to activate a second virtual machine on the server, the second virtual machine executing an instance of the first service.

2. The service availability controller of claim 1, wherein the selector is to indicate a priority of the second service by selecting the server according to a service availability requirement.

3. The service availability controller of claim 1, wherein the service controller is to activate a second instance of the second service executing on a third virtual machine on a second server.

4. The service availability controller of claim 1, wherein the service controller is configure the second virtual machine and the instance of the first service according to a configuration of a failed virtual machine and failed instance of the first service.

5. The service availability controller of claim 1, wherein the hypervisor controller is to deactivate the first virtual machine after the service controller deactivates the instance of the second service.

6. A method, comprising:
monitoring a first availability of a first service, the first service having a first availability requirement and a first availability tolerance;
detecting a reduction in the first availability of the first service;
creating capacity for the first service by deactivating a second service on a first active virtual machine on a server, the second service having a second availability exceeding a second availability tolerance and having a second availability requirement lower than the first availability requirement; and
activating a second active virtual machine executing the first service on the server.

7. The method of claim 6, further comprising: selecting the server according to a priority assignment of all active services on the server.

8. The method of claim 6, further comprising: deactivating a plurality of services on the server, the second service being one of the plurality, and the services of the plurality having respective service availabilities exceeding respective service availability tolerances and respective services availability requirements lower than the first service availability requirement.

9. The method of claim 8, wherein the plurality of services are executed on a corresponding plurality of active virtual machines; and further comprising: shutting down the corresponding plurality of active virtual machines after deactivating the plurality of services.

10. The method of claim 6, further comprising: activating the second service on a third active virtual machine executing the second service on a second server.

11. A non-transitory computer readable medium storing instructions executable to:
monitor availabilities of a plurality of services, each service having a respective availability requirement and a respective availability tolerance;
detect if a first availability of a first service of the plurality is reduced based on monitoring the availabilities of the plurality of services;
determine if a second service of the plurality has a respective availability exceeding the respective availability tolerance of the second service, the second service having a lower respective availability requirement than the first service;
create capacity for the first service by deactivating an instance of the second service on a first virtual machine executing on a server; and
activate an instance of the first service on a second virtual machine executing on the server.

12. The non-transitory computer readable medium of claim 11, storing further instructions executable to:
select the second service from a list of transferable services associated with the first service; and indicate a priority of the second service by selecting the server from a plurality of servers according to an availability requirement.

13. The non-transitory computer readable medium of claim 11, storing further instructions executable to: deactivate instances of any services executing on the server that have lower availability requirements than the first service and have availabilities exceeding corresponding availability tolerances.

14. The non-transitory computer readable medium of claim 11, storing further instructions executable to: shut down the first virtual machine after deactivating the instance of the second service.

15. The non-transitory computer readable medium of claim 11, storing further instructions executable to: configure the second virtual machine and the instance of the first service according to a configuration of a failed virtual machine and failed instance of the first service.

* * * * *